(12) United States Patent
Baek et al.

(10) Patent No.: US 7,861,035 B2
(45) Date of Patent: Dec. 28, 2010

(54) METHOD OF IMPROVING INPUT AND OUTPUT PERFORMANCE OF RAID SYSTEM USING MATRIX STRIPE CACHE

(75) Inventors: Sung Hoon Baek, Daejeon (KR); Kyu Ho Park, Chungcheongnamdo (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 384 days.

(21) Appl. No.: 11/759,951

(22) Filed: Jun. 8, 2007

(65) Prior Publication Data

US 2008/0010502 A1 Jan. 10, 2008

(30) Foreign Application Priority Data

Jun. 20, 2006 (KR) .................... 10-2006-0055355

(51) Int. Cl.
*G06F 12/12* (2006.01)
(52) U.S. Cl. ...................................... 711/114; 711/159
(58) Field of Classification Search ................. 714/805
See application file for complete search history.

(56) References Cited

U.S. PATENT DOCUMENTS

| | | | | |
|---|---|---|---|---|
| 5,390,327 | A * | 2/1995 | Lubbers et al. ............... | 714/7 |
| 5,408,644 | A * | 4/1995 | Schneider et al. ............. | 714/1 |
| 5,542,066 | A * | 7/1996 | Mattson et al. ............. | 711/136 |
| 5,596,736 | A * | 1/1997 | Kerns ........................... | 711/4 |
| 6,192,450 | B1 * | 2/2001 | Bauman et al. ............. | 711/135 |
| 2002/0091903 | A1 * | 7/2002 | Mizuno ....................... | 711/154 |
| 2004/0148462 | A1 * | 7/2004 | Uysal et al. ................. | 711/118 |
| 2004/0205387 | A1 * | 10/2004 | Kleiman et al. ............... | 714/6 |
| 2006/0277350 | A1 * | 12/2006 | Lubbers ....................... | 711/3 |

OTHER PUBLICATIONS

Gill et al, "WOW: Wise Ordering for Writes—Combining Spatial and Temporal Locality in Non-Volatile Caches", USENIX FAST 2005, Dec. 2005.*
Menon et al, "The Architecture of a Fult-Tolerant Cached RAID Controller", IEEE, 1993.*
Jacobson et al, "Disk scheduling algorithms based on rotational position", HP Laboratories Technical Report, 1995.*
Worthington et al, "Scheduling Algorithms for Modern Disk Drives", ACM SIGMETRICS, 1994.*
"A Case for Redundany Arrays of Inexpensive Disks(RAID)" ACMSIGMOD. 1998, D. A. Patterson et al.
"WOW: Wise Ordering for Writes—Combining Spatial and Temporal Locality in Non-volatile Caches" USENIX FAST 2005, Binny S. Gill et al.
"Scheduling algorithms for modern disk drives" SIGMETRICS, D. L. Worthingtron.

* cited by examiner

*Primary Examiner*—Sanjiv Shah
*Assistant Examiner*—Daniel Chappell
(74) *Attorney, Agent, or Firm*—Bachman & LaPointe, P.C.

(57) ABSTRACT

A method of improving the Input/Output (I/O) performance of a Redundant Array of Independent Disks (RAID) system using a Matrix Stripe Cache (MSC). The method includes a first step of generating a rxw matrix, that is, a read and write matrix, present before row combination, through a unit MSC that will perform writing on a disk, a second step of generating a rxw matrix, that is, a final read and write matrix, from the rxw matrix present before row combination, which is generated at the first step, through row combination, and a third step of performing reading based on the row-combined rxw matrix generated at the second step, performing an XOR operation on the row-combined rxw matrix on a row basis, and performing writing on the row-combined rxw matrix on a column basis.

9 Claims, 9 Drawing Sheets

[Figure 1]
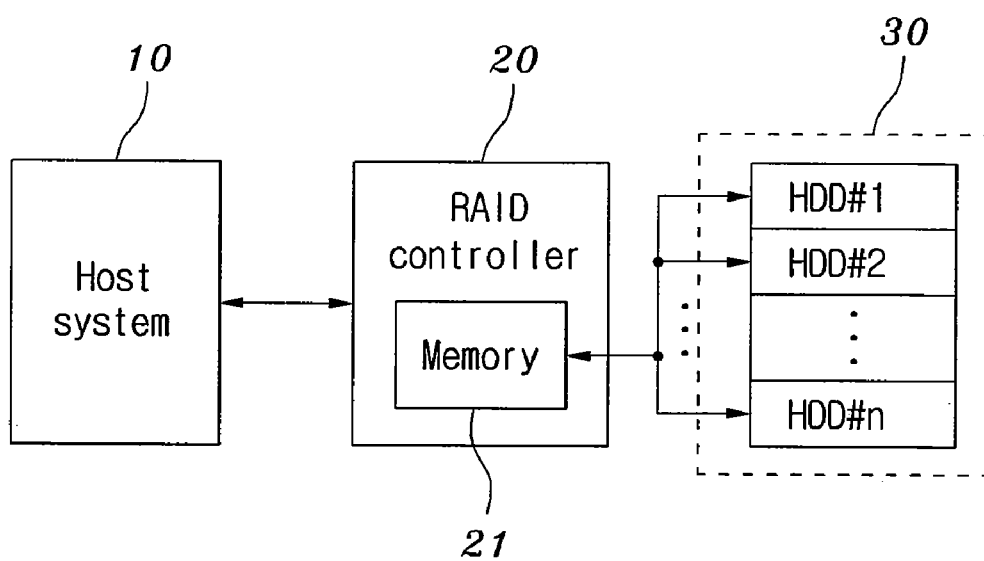

[Figure 2]
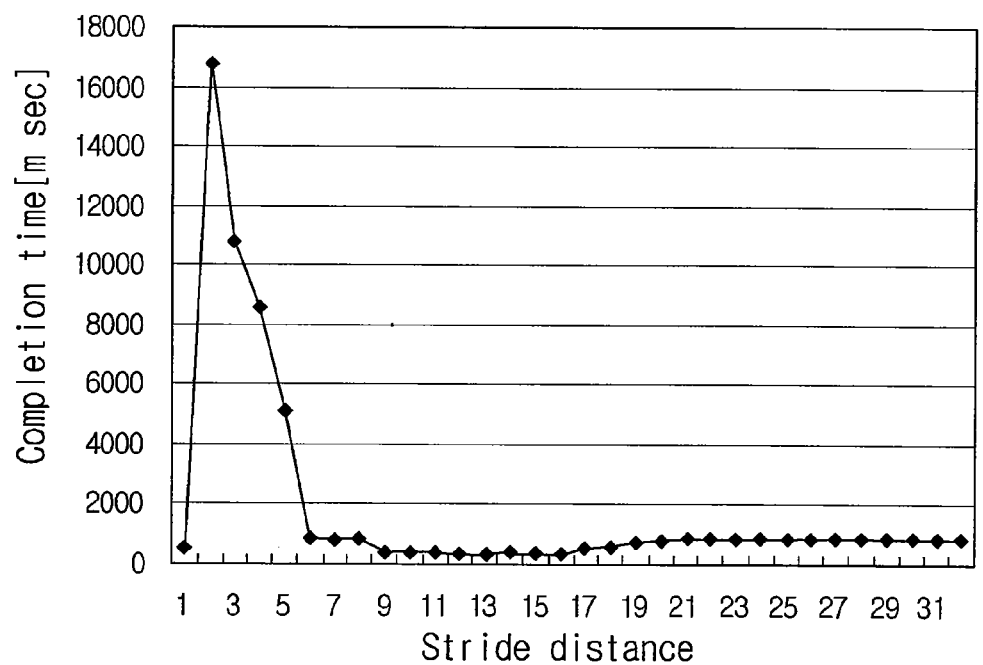

[Figure 3]
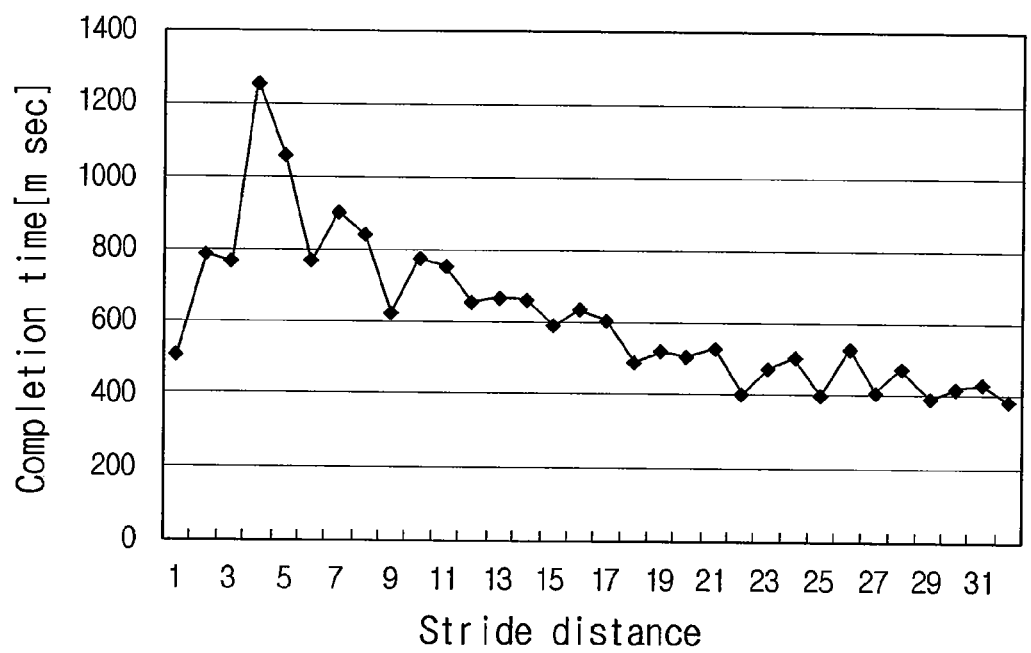

[Figure 4]
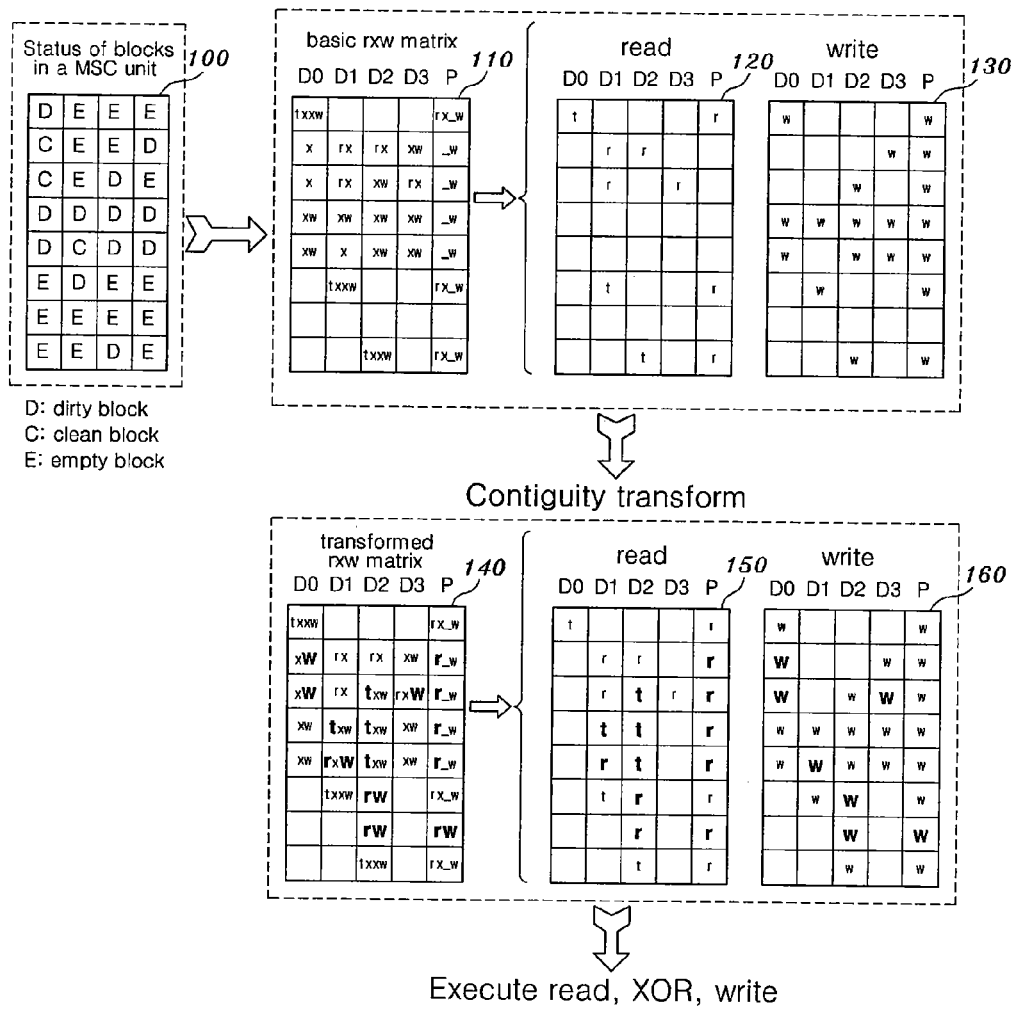

[Figure 5]
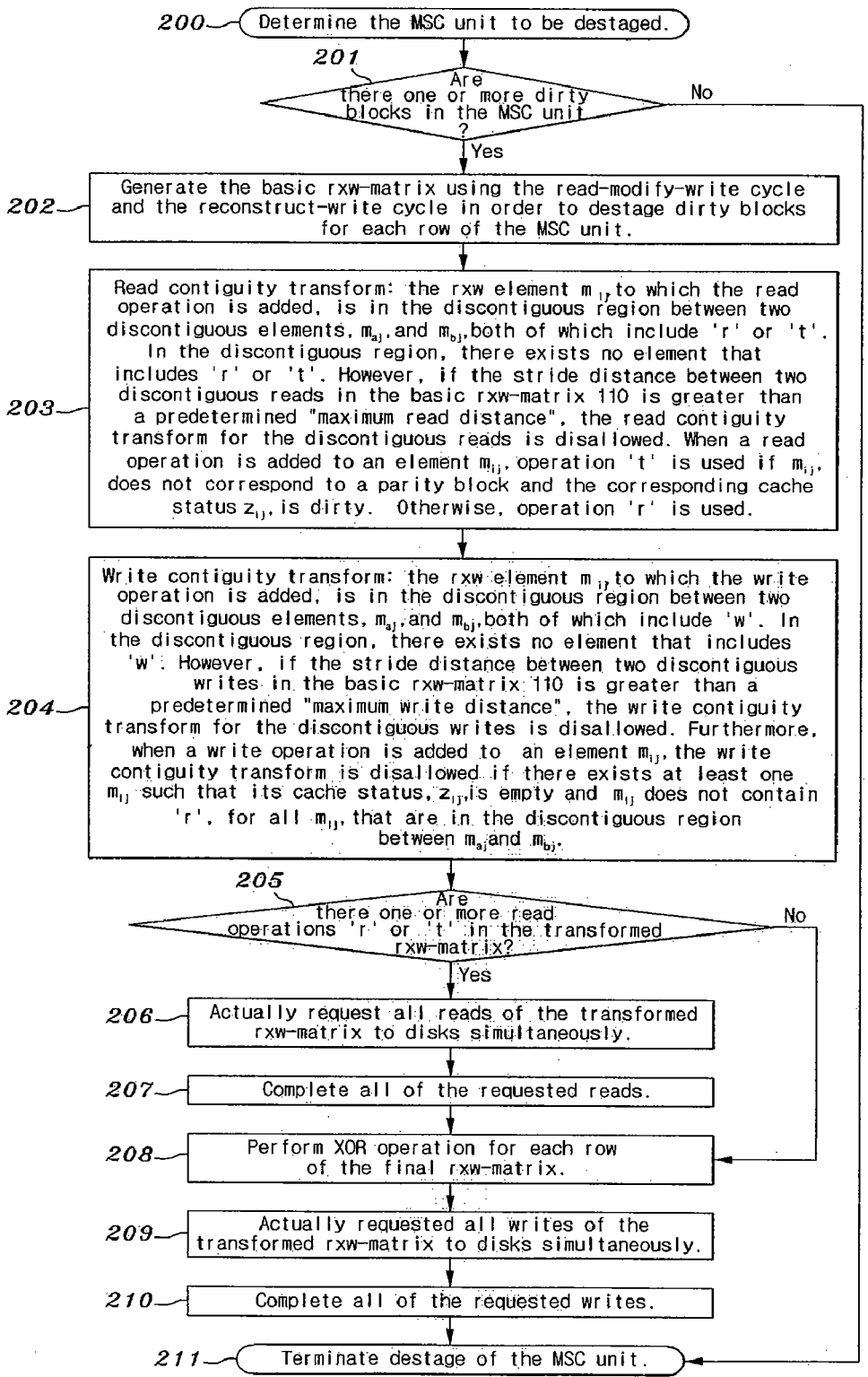

[Figure 6]
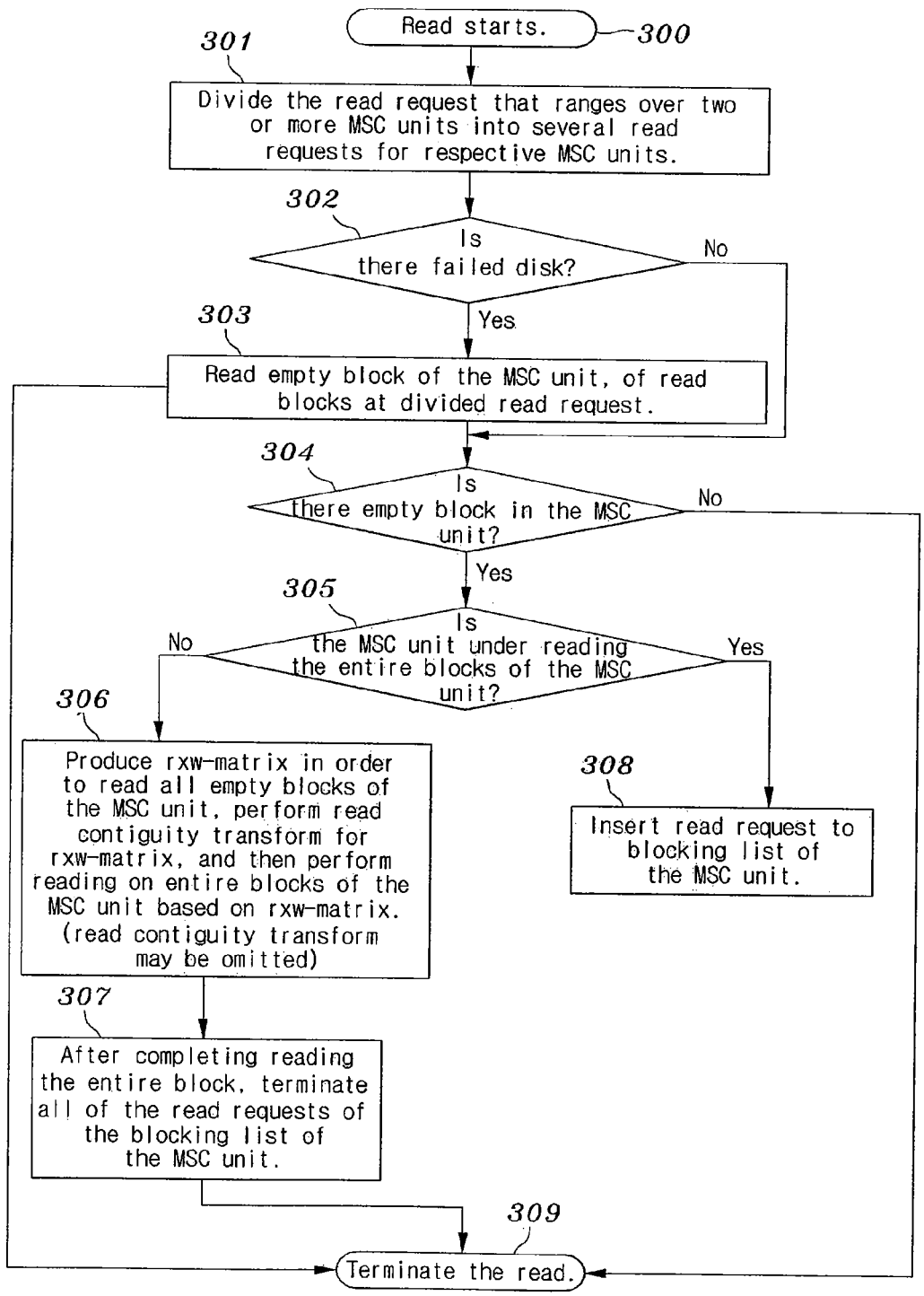

[Figure 7]
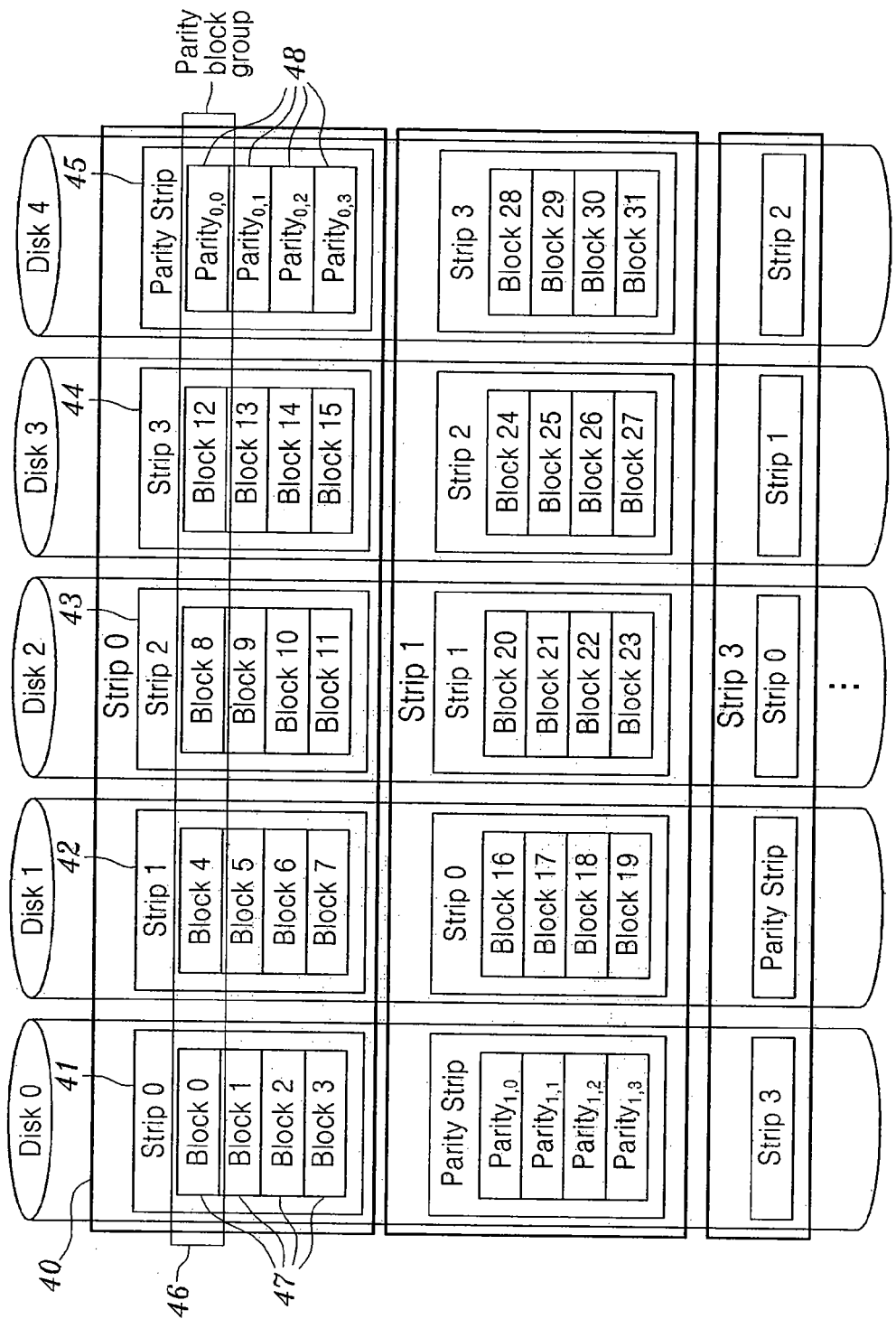

[Figure 8]
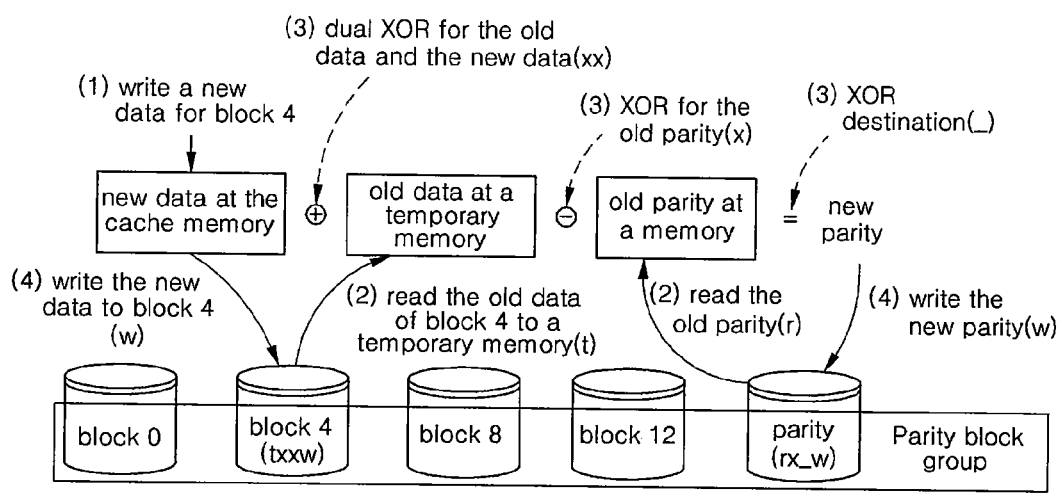

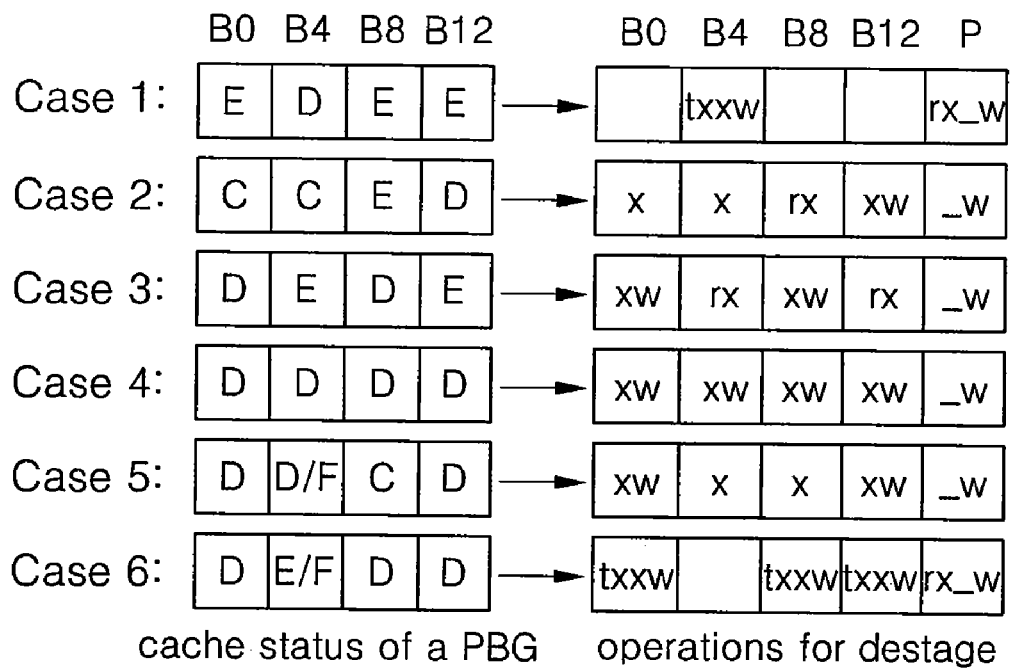
[Figure 9]

METHOD OF IMPROVING INPUT AND OUTPUT PERFORMANCE OF RAID SYSTEM USING MATRIX STRIPE CACHE

BACKGROUND OF THE INVENTION

1. Field of the Invention

The present invention relates, in general, to a method of improving the Input/Output (I/O) performance of a Redundant Array of Independent Disks (RAID) system. More particularly, the present invention relates to a method of improving the I/O performance of a RAID system using a Matrix Stripe Cache (MSC); which performs read connections and write connections for each column of the MSC in order to reduce the number of I/O operations, thereby improving the performance of fragmented writes; and which improves read performance of a normal mode at the expense of read performance of a degraded mode.

2. Description of the Related Art

A RAID system integrates several independent disk storage devices into one, distributes and stores data across respective disks, and enables simultaneous access to multiple disks, thereby improving I/O characteristics. Furthermore, a RAID system allows a plurality of independent disk storage devices to be viewed as a single disk by a host computer system, thereby implementing a high-capacity storage device.

Furthermore, a RAID system accommodates auxiliary data such as disk copy or Error Checking and Correction (ECC) code or parity data, so that data can be recovered automatically even if any one disk of the RAID system fails, thereby increasing the reliability of the system.

FIG. 1 is a diagram showing the schematic construction of a general RAID system. The RAID system includes a host system 10 considered to be a system main body, a plurality of hard disks 30 connected to the host system 10, and a RAID controller 20 connected between the host system 10 and the hard disks 30 and configured to manage the hard disks 30. The RAID controller 20 includes memory 21 for compensating for the difference in speed between the host system 10 and the hard disks 30.

Furthermore, RAID systems are classified into five levels according to configuration. According to the article written by Patterson et al., RAID systems are classified into five types, that is, RAID level 1 through RAID level 5.

RAID level 1 is a technique of storing data in N disks, storing data in N other disks, and copying and storing data to other mirror disks. At the time of writing data, the same data must always be stored into two different disks. At the time of reading the data, one of the two disks, which has the faster access time, may be selected and the data may be read from the selected disk. If one of the two disks fails, service can be continuously provided using the mirror disk.

RAID level 2 is a technique of protecting data using Hamming code, and incurs less disk cost than the mirroring scheme of RAID 1.

RAID level 3 is a technique in which one parity disk is added to a group of N data disks. At this level, at the time of writing data, data is distributed across and stored in the N respective disks in bits or bytes, and parity data obtained by performing an XOR operation on data stored in each data disk is stored in the parity disk. At the time of reading data, the N disks must be accessed at the same time. If one of the N disks fails, information can be recovered using the parity data stored in the parity disk.

RAID level 4 includes N+1 disks, where data is stored in N disks and parity is stored in the other disk, RAID level 4 is fairly similar to RAID level 3 but it is different from RAID level 3 in that data is distributed and stored in terms of block. Therefore, at the time of writing data, access to one data disk and the parity disk is required, and at the time of reading data, only one disk is accessed. Furthermore, when one disk fails, information can be recovered using the parity blocks stored in the parity disk.

RAID level 5 is similar to RAID level 4 in that data is stored in terms of block but it is different from RAID level 4 in that parity data is distributed across disks instead of storing the parity data in a fixed disk. At this level, methods used when data is read and written and a data recovery method used when one disk fails are the same as those of RAID level 4.

In addition, there are RAID level 0, which simply distributes and accommodates data without using auxiliary data, and RAID level 6, which has a P+Q error recovery method using Reed-Solomon code. RAID level 6 exhibits higher reliability than methods using parity because information can be recovered even if two disks fail at the same time. Currently, most RAID systems support RAID levels 0, 1, 3 and 5, and RAID level 0/1, that is, a combination of RAID levels 0 and 1. A RAID level suitable for the user application environment is selected and used.

Meanwhile, the RAID levels accompanied by parity, such as RAID level 5, exhibit very poor performance for small write operations. To solve this problem, destage algorithms have been developed.

The term "destage" refers to a method of copying write data to a cache instead of immediately transferring the data to a disk when a write is requested, and then the data is transferred to the disk later. The destage algorithms include Wise Ordering for Write (WOW), High Low Water Mark (HLWM), Linear Threshold (LT) Scheduling, etc.

Furthermore, cache replacement algorithms for reducing the number of disk I/O operations in order to improve reading performance include ARC, 2Q, MQ, LRU-2, ALRFU, LIRS, MRU, LRU, etc. Disk scheduling algorithms such as CSCAN, SSTF, and Anticipatory disk scheduling reduce seek and rotational latency of the disk.

Furthermore, patents related to a conventional RAID system include U.S. Pat. No. 6,704,837. in which, in order to improve the write performance of a RAID system, the size of write operations and the track size of a disk are compared with each other at the time of destage.

Furthermore, "A Case for Redundant Arrays of Inexpensive Disks (RAID)" (ACM SIGMOD. 1988, D. A. Patterson et al.) proposes a RAID structure, but does not present a method of improving the I/O performance of a RAID system. "WOW: Wise Ordering for Writes—Combining Spatial and Temporal Locality in Non-volatile Caches" (USENIX FAST 2005, Binny S. Gill et al.) discloses only one of the destage algorithms for improving the write performance of a RAID system. "Scheduling algorithms for modern disk drives" (SIGMETRICS, D. L. Worthington) introduces a variety of disk scheduling techniques for improving the read and write performance of a disk.

Furthermore, in a RAID system, writing data is generally performed sequentially. However, if a file system is highly fragmented (that is, one file is not consecutively stored in a disk, that is, as one unit, but is divided into several fragments and discontinuously stored in a disk), writing data is viewed as a fragmented sequential write from the point of view of a disk. That is, the pattern of write exhibits a stride pattern, that is, a jump pattern, in which case very poor performance results. Furthermore, in the RAID system, a RAID controller does not take advantage of the maximum performance of disks due to a complex implementation in which a disk failure-tolerant function must be supported. Furthermore, the RAID system can read data without loss when a disk fails (in a degraded mode). However, the RAID system entails a lot of overhead during a read operation due to the complexity of the implementation thereof, therefore reading performance is degraded both in a normal mode and in a degraded mode.

SUMMARY OF THE INVENTION

Accordingly, the present invention has been made keeping in mind the above problems that occur in the prior arts, and an object of the present invention is to provide a method of improving the I/O performance of a RAID system using an MSC, which can improve the performance of the RAID system and is compatible with the existing destage algorithms, the existing cache replacement algorithms and the existing disk scheduling algorithms.

Another object of the present invention is to provide a method of improving the I/O performance of a RAID using an MSC, which can improve the performance of fragmented sequential writes in a RAID controller and provides efficient implementation of RAID, and which can improve the read performance of a normal mode of RAID at the expense of read performance of a degraded mode of RAID.

In order to accomplish the above objects, the present invention provides a method of improving I/O performance of a RAID system using a MSC, which is a stripe cache managed by a rxw-matrix for a contiguity transform of fragmented writes. The elements of the rxw-matrix correspond to the blocks of the stripe. The method includes a first step of generating the basic rxw-matrix, which presents all of reads, xor operations, and writes that are required to destage a stripe cache, which is selected to be destaged to disks; a second step of performing the contiguity transform for the basic rxw-matrix in order to generate a transformed rxw-matrix, which contains final reads, xor operations, and writes that are required to destage the selected stripe cache; and a third step of performing reads based on the transformed rxw-matrix generated at the second step, performing XOR operations based on the transformed rxw-matrix, and performing writes based on the transformed rxw-matrix.

The contiguity transform of the second step consists of a read contiguity transform and a write contiguity transform. The read contiguity transform must precede the write contiguity transform to increase the possibility of the write contiguity transform.

For each column of the basic rxw-matrix, the read contiguity transform inserts read operations between two discontiguous reads that are located in the same column. The write contiguity transform inserts write operations between two discontiguous writes for each column of the basic rxw-matrix.

For each column of the basic rxw-matrix, the read contiguity transform is not permitted if the number of elements having no read operation between two discontiguous elements having a read operation is greater than a predetermined maximum read distance; For each column of the basic rxw-matrix, the write contiguity transform is not permitted if the number of elements having no write operation between two discontiguous elements having a write operation is greater than a predetermined maximum write distance.

The predetermined maximum read distance is a stride distance that exhibits faster performance than a contiguous read, where the stride distance is defined by the number of blocks between two discontiguous I/Os. The predetermined maximum write distance is a stride distance that exhibits faster performance than a contiguous write. The maximum read distance and the maximum write distance are obtained from a member disk of a disk array by a stride benchmark, which is automatically performs when an administrator create the disk array. The stride benchmark generates the workload in a stride pattern by varying the stride distance.

In order to accomplish the above objects, the present invention provides a method of improving the I/O performance of a RAID system using an MSC, the method including a first step of determining whether at least one dirty block exists in the MSC unit that is selected to be destaged to disks (if a host writes a block, the written data is copied into a corresponding block cache of a MSC unit before actually destage it to a disk and the block cache becomes a dirty block.); a second step of, if at least one dirty block is determined to exist in the MSC unit, generation of read/xor/write operations into a basic rxw-matrix in order to destage the MSC unit; a third step of the read contiguity transform, which inserts read operations into all elements of the basic rxw-matrix between two discontiguous read elements that are located in the same column if the stride distance between the two discontiguous read elements is not greater than the maximum read distance; a fourth step of the write contiguity transform, which inserts write operations into all elements of the basic rxw-matrix between two discontiguous write elements that are located in the same column if the stride distance between the two discontiguous write elements is not greater than the maximum write distance; a fifth step of determining whether a read operation is at least one in the transformed rxw-matrix that is processed through the third and fourth steps, and reading for each column of the transformed rxw-matrix if there is at least one read operation; and a sixth step of performing an XOR operation for each row of the transformed rxw-matrix, and then performing writing for each column of the transformed rxw-matrix.

In order to accomplish the above objects, the present invention provides a method of improving the I/O performance of a RAID system using an MSC, the method including a first step of separating the read request into multiple read requests for the respective MSC units if a read request ranges over at least two MSC units; a second step of determining whether a failed disk exists; a third step of, if, as a result of the determination at the second step, no failed disk is found to exist, determining whether an empty block exists in a corresponding MSC unit; a fourth step of, if, as a result of the determination at the third step, an empty block is found to exist, determining whether the corresponding MSC unit is under reading the entire blocks of the MSC unit; a fifth step of, if, as a result of the determination at the fourth step, the MSC unit is determined to read the entire blocks of the MSC unit, adding the read request to a blocking list of the MSC unit; a sixth step of, if, as a result of the determination at the fourth step, it is determined that the MSC unit is not under reading the entire blocks of the MSC unit, producing a rxw-matrix, that is, a read and write matrix for all of the empty blocks of the MSC unit, and reading entire blocks of the MSC unit based on the rxw-matrix; and a seventh step of terminating all read requests existing in the blocking list of the MSC unit after the entire read has been completed at the sixth step.

BRIEF DESCRIPTION OF THE DRAWINGS

The above and other objects, features and advantages of the present invention will be more clearly understood from the following detailed description taken in conjunction with the accompanying drawings, in which:

FIG. 1 is a diagram showing the general architecture of a RAID system;

FIG. 2 is a graph showing the read execution time in a hard disk by varying the stride distance;

FIG. 3 is a graph showing the write execution time in a hard disk by varying the stride distance;

FIG. 4 is a diagram illustrating an embodiment of write using an MSC according to the present invention;

FIG. 5 is a flowchart showing a write operation using the MSC of the present invention; and FIG. 6 is a flowchart showing a read operation using the MSC of the present invention.

FIG. 7 The data organization and terminologies of a RAID-5 array

FIG. 8 A read-modify-write-cycle in a RAID-5 array

FIG. 9 Destage operations of RAID-5 in various cases of PBG.

DESCRIPTION OF THE PREFERRED EMBODIMENTS

Preferred embodiments of the present invention will be described in detail with reference to the accompanying drawings.

The present invention is supplementary to and compatible with existing destage algorithms, cache replacement algorithms and disk scheduling methods, and can be applied to various RAID levels, such as RAID level 0, RAID level 1, RAID level 5 and RAID level 6.

A principal feature of the present invention is the effective use of the characteristics of a disk shown in FIGS. 2 and 3. FIG. 2 is a graph showing the turnaround time of read versus the stride distance, where the read start at the same preset block and stops when it reaches the same preset destination. The stride distance is defined by the number of blocks between two discontiguous I/Os. Blocks are contiguously read when the stride distance is 1. When the stride distance is 2, one block is skipped, then a subsequent one block is read, and this pattern is repeated. When the stride distance is 3, two blocks are skipped, then one block is read, and this pattern is repeated.

FIG. 3 is a graph showing execution times measured on a hard disk by varying the stride distance. The results of FIGS. 2 and 3 show a steep decrease in performance when the stride distance is 2. FIG. 2 shows that discontiguously sequential I/Os of the stride distance larger than 5 outperforms the sequential I/O, whose stride distance is one. In FIG. 3, discontiguously sequential I/Os of the stride distance larger than 21 outperforms the sequential I/O. The present invention improves the performance of a RAID system using such a disk characteristic.

The RAID Advisory Board describes RAID-5 using the terminology of both strip and stripe in more detail, as show in FIG. 7 A RAID-5 array is organized by stripes 40, each of which consists of a parity strip 45 and data strips 41~44. Each strip 41~45 comprises a set of blocks 47 that are partitioned by disks. The parity block group (PBG) 46 is defined by the group of blocks that are located at the same offset of the member disks. The parity block in the parity strip 45 stores the result of the bitwise exclusive OR (XOR) of the data blocks that are in the same PBG 46. The parity strip 45 comprises the parity blocks 48 in the stripe 40.

In the present invention, a stride cache is used to improve the I/O performance. The size of a stripe cache unit used in the method proposed in the present invention is the size of the stripe. The cache consisting of the stripe cache units is managed in terms of stripe. In other words, each stripe cache unit corresponds to each stripe, which is the management unit for cache replacement and for destages. In the present invention, matrix stripe cache (MSC) unit is a stripe cache unit that is managed by the proposed rxw-matrix for the proposed contiguity transform. The elements of the rxw-matrix correspond to blocks 47 and 48. The columns of the rxw-matrix correspond to the strips 41~45.

Furthermore, in the present invention, the contiguity transform generates the rxw-matrix to destage a stripe and transforms two discontiguous reads or writes into a contiguous read or write by inserting additional reads and writes into the discontiguous region. The contiguity transform exploits rules for consistency and performance, which enable data to be consistent without filesystem dependency, data modification, and performance degradation. The cache, which is managed in terms of MSC unit, provides easy implementation of a RAID system and efficient performance for sequential or bulky I/Os, and exploits spatial locality. Furthermore, the present invention improves read performance of a normal mode, which is more important, at the expense of read performance of a degraded mode. The present invention is performed in the RAID controller of FIG. 1.

Although the present invention can be applied to various RAID levels, the application of the present invention to RAID level 5 will be described as an example.

FIG. 4 shows an embodiment of a destage operation of the present invention, wherein five disks constitute a RAID level 5 array.

A write data transferred to the RAID is cached in the memory 21 of the RAID control unit 20 shown in FIG. 1. A cache is managed in terms of MSC unit 100.

Cache memory may not be assigned to empty blocks of an MSC unit, or all cache memory may be assigned to all respective blocks of an MSC in advance. The present invention is not limited to either of the two methods.

In the MSC unit 100 of FIG. 4, each block cache of the MSC unit 100 may be a dirty block, a clean block or an empty block. In FIG. 4, "D" denotes for a dirty block, "C" denotes for a clean block, and "E" denotes for an empty block. Each block cache of the MSC unit 100 corresponds to each block of the stripe. In other words, "columns" refers to respective disks, and "rows" refers to data blocks in ascending order. When a block data is written from a host to a RAID system, the block data is copied to the corresponding block cache of the MSC unit 100, and the block cache becomes a dirty block. When a block is read or a dirty block of the MSC unit 100 is written into a disk, the block becomes a clean block. In the MSC unit 100, an empty block indicates that the corresponding block cache does not contain meaningful data.

Furthermore, after a MSC unit 100 is selected to be destaged by a destage method for what to destage, a basic rxw-matrix 110 is generated from the selected MSC unit 100, and then the contiguity transform converts the basic rxw-matrix 110 into the transform rxw-matrix 140. Finally, reads from disks, XOR operations of the block caches, and writes to disks are performed using the transformed rxw-matrix 140.

All operations of RAID-5 can be categorized by six operations: r, t, w, x, xx. In FIG. 4, 'r' indicates a read operation for the block from the disk to the block cache memory, and 't' indicates a read operation for the block from the disk to a temporary memory. 'x' indicates that a corresponding block is an operand of an XOR operation, 'xx' indicates that temporary memory based on the operation 't' of the corresponding block and the block cache of the corresponding block are operands, '_' indicates the destination of an XOR operation, and 'w' indicates a write operation for a corresponding block.

We use these mnemonics to conveniently describe our work. To update one block with new data, it is necessary to (1) read all other blocks of the PBG to which the updated block belongs, unless it is cached; (2) XOR all data blocks; and (3) write the parity block and the new block. This operation requires (N−1−d−c) reads and (d+1) writes, both of which comprise (N−c) I/Os, where N is the number of disks, c is the number of cached clean blocks, and d is the number of dirty blocks to be updated. This process is known as a reconstruct-write cycle. When d=N−1, it is unnecessary to read any block; this case is known as a full-parity-block-group-write.

A read-modify-write cycle can be used to reduce the number of I/Os when N−c>2(1+d), as the reconstruct-write cycle requires (N−c) I/Os while the read-modify-write cycle requires 2(1+d) I/Os. This process does the following: (1) it copies the new data to the cache memory; (2) it reads the old parity block (r) and reads the old block to a temporary memory (t) simultaneously; (3) it XORs the new block with the old block (xx), and XORs the result with the old parity block (x) to generate the new parity block (_); and (4) it writes the new block (w) and writes the new parity block (w) simultaneously, as shown in FIG. 8. The read-modify-write cycle requires (1+d) reads and (1+d) writes, both of which comprise 2(1+d) I/Os.

For various cases of cache status, FIG. 9 shows operations for a destage by the mnemonics. If two blocks are cached (clean) and another block is written (dirty) as shown in Case 2 of FIG. 9, we choose the reconstruct-write cycle to destage the PBG, as N−c<2(1+d), where N=5, c=2, and d=1. Hence it is necessary to read the empty block (r), XOR all data blocks to update the parity block (x), and write the dirty block and the new parity (w). Therefore, the clean blocks only involve x, the dirty block requires xw, the empty block requires rx, and the parity block requires w. If all blocks are dirty as in Case 4, it is necessary to XOR all data blocks without a read, and write all blocks and the parity. In other words, all data blocks and the parity block require xw and w, respectively. Case 1 and 6 in FIG. 9 show the cases that use the read-modify-write cycle.

In the block status in a MSC unit 100, "D" denotes a dirty block in which new data is in the cache but not yet updated to a disk, "C" denotes a clean block in which consistent data with the disk is in the cache, and "E" denotes an empty block in which valid data is not in the cache. Let u be the number of blocks per strip, and let v be the number of disks consisting of a RAID-5 array. The cache status of the blocks of a MSC unit 100 that is shown in FIG. 4 can be represented by the following u×(v−1) matrix:

$$Z = [z_{ij}]_{u \times (v-1)} = \begin{bmatrix} D & E & E & E \\ C & E & E & D \\ C & E & D & E \\ D & D & D & D \\ D & C & D & D \\ E & D & E & E \\ E & E & E & E \\ E & E & D & E \end{bmatrix} \quad (1)$$

Before the actual execution of the read, XOR, and write for all blocks in a stripe, it is necessary to determine which blocks should be read, how the parity blocks should be made, and which blocks should be written, by generating a basic rxw-matrix, as shown in FIG. 4. By choosing one of the reconstruct-write cycle and the read-modify-write cycle shown in FIG. 9 for each row of the matrix Z, we determines the basic rxw-matrix, M, 110 whose element, $m_{ij}$, is a subset of {t, r, x, xx, w}. The basic rxw-matrix 110 represents all operations that destage all blocks in the stripe. We can express the basic rxw-matrix 110 shown in FIG. 4 as the following equation:

$$M = [m_{ij}]_{u \times v} \quad (2)$$

$$= \begin{bmatrix} m_{11} & m_{12} & m_{13} & m_{14} & m_{15} \\ m_{21} & m_{22} & m_{23} & m_{24} & m_{25} \\ m_{31} & m_{32} & m_{33} & m_{34} & m_{35} \\ m_{41} & m_{42} & m_{43} & m_{44} & m_{45} \\ m_{51} & m_{52} & m_{53} & m_{54} & m_{55} \\ m_{61} & m_{62} & m_{63} & m_{64} & m_{65} \\ m_{71} & m_{72} & m_{73} & m_{74} & m_{75} \\ m_{81} & m_{82} & m_{83} & m_{84} & m_{85} \end{bmatrix}$$

$$= \begin{bmatrix} \{txxw\} & \{\} & \{\} & \{\} & \{rx\_w\} \\ \{x\} & \{rx\} & \{rx\} & \{xw\} & \{\_w\} \\ \{x\} & \{rx\} & \{xw\} & \{rx\} & \{\_w\} \\ \{xw\} & \{xw\} & \{xw\} & \{xw\} & \{\_w\} \\ \{xw\} & \{x\} & \{xw\} & \{xw\} & \{\_w\} \\ \{\} & \{txxw\} & \{\} & \{\} & \{rx\_w\} \\ \{\} & \{\} & \{\} & \{\} & \{\} \\ \{\} & \{\} & \{txxw\} & \{\} & \{rx\_w\} \end{bmatrix}$$

A method of generating parity blocks for parity block groups in order to destage dirty blocks is described by the basic rxw-matrix 110. For example, in the first row of the basic rxw-matrix 110, a dirty block ($z_{11}$) exists in a first column that is correspond to disk Do but all blocks ($z_{21}$, $z_{31}$, $z_{41}$) of the other columns are empty. Then, the read-modify-write cycle is used. $m_{11}$ of the basic rxw-matrix 110 becomes txxw, and $m_{15}$ that is the parity block of the parity block group becomes rx_w. In other words, $m_{11}$ performs operation 't', $m_{15}$ performs operation 'r', an XOR operation is performed on the temporary and cache memory of $m_{11}$ and the cache memory of $m_{15}$, and then $m_{11}$ and $m_{15}$ perform operation 'w'.

The third row of the basic rxw-matrix 110 is taken as an example. $z_{33}$ is a dirty block, and $z_{31}$ is a clean block. Accordingly, $m_{31}$ becomes 'x', $m_{32}$ becomes 'rx', $m_{33}$ becomes 'xw', $m_{34}$ becomes 'rx', and $m_{35}$ becomes '_w' by the reconstruct-write cycle.

A read matrix 120, illustrating only read operations in the basic rxw-matrix 110 is shown in FIG. 4. The read matrix 120 is not a matrix that exists separately. The read matrix 120 is shown in FIG. 4 in order to easily illustrate only read operations in the basic rxw-matrix 110. A write matrix 130 is a matrix that does not exist and is shown to easily illustrate only write operations in the same manner as the read matrix 120.

After the basic rxw-matrix 110 is generated from the block status of the MSC unit 100, the contiguity transform that consists of the read contiguity transform and the write contiguity transform is performed in order to produce the transformed rxw-matrix 140.

The fundamental principle of the read contiguity transform is as follows:

The rxw element $m_{ij}$, to which the read operation can be added, is in the discontiguous region between two discontiguous elements, $m_{aj}$ and $m_{bj}$, both of which include 'r' or 't'. In the discontiguous region, there exists no element that includes 'r' or 't'. In the case of the second column shown in FIG. 4, it is possible to add 'r' or 't' between $m_{32}$ and $m_{62}$, where j=2, a=3 and b=7.

Meanwhile, when a read operation is added to an element $m_{ij}$, operation 't' is used if $m_{ij}$ does not correspond to a parity block and the corresponding cache status $z_{ij}$ is dirty. Otherwise, operation 'r' is used.

The write contiguity transform follows the read contiguity transform. The fundamental principle of the write contiguity transform is as follows:

The rxw element $m_{ij}$, to which the write operation can be added, is in the discontiguous region between two discontiguous elements, $m_{aj}$ and $m_{bj}$, both of which include 'w'. In the discontiguous region, there exists no element that includes 'w'. In the case of the first column shown in FIG. 4, it is possible to add 'w' between $m_{11}$ and $m_{41}$, where j=1, a=1 and b=4.

Furthermore, when a write operation is added to an element $m_{ij}$, the write contiguity transform is disallowed if there exists at least one $m_{ij}$ such that its cache status $z_{ij}$ is empty and $m_{ij}$ does not contain 'r', for all $m_{ij}$ that are in the discontiguous region between $m_{aj}$ and $m_{bj}$.

There are the other limitations of the contiguity transform. If the stride distance between two discontiguous reads in the basic rxw-matrix 110 is greater than a predetermined "maximum read distance", the read contiguity transform for the discontiguous reads is disallowed. In a similar way, if the stride distance between two discontiguous writes in the basic rxw-matrix 110 is greater than a predetermined "maximum write distance", the write contiguity transform for the discontiguous writes is disallowed.

The predetermined maximum read distance is a stride distance that exhibits faster performance than a contiguous read, where the stride distance is defined by the number of blocks between two discontiguous I/Os. The predetermined maximum write distance is a stride distance that exhibits faster performance than a contiguous write. The maximum read distance and the maximum write distance are obtained from a member disk of a disk array by a stride benchmark, which is automatically performs when an administrator create the disk array. The stride benchmark generates the workload of a stride pattern by varying the stride distance.

The "maximum read distance" value and the "maximum write distance" value are stored in a non-volatile storage that can permanently store the values.

The transformed rxw-matrix 140 is generated by the contiguity transform for the basic rxw-matrix 110. In order to easily understand how the contiguity transform is performed by comparing the read matrix 120 and the write matrix 130. FIG. 4 shows the transformed read matrix 150 and the transformed write matrix 160, both of which are driven from the transformed rxw-matrix, and do not exist physically.

Finally, actual reads, XORs, writes to destage the MSC unit 100 are performed after generating the transformed rxw-matrix 140. All reads of the transformed rxw-matrix 140 are actually requested to disks simultaneously. After all of the requested reads are completed, XOR operations are performed and all writes of the transformed rxw-matrix 140 is requested to disks. When all of the requested writes are completed, destaging the MSC unit 100 is completed.

When the contiguity transform is performed as described above, a plurality of read or write commands forms a single disk command, even though the single disk command has a longer data length. The latter disk command exhibits faster performance than the former disk commands.

A process resulting in the generation of the transformed rxw-matrix 140 of the MSC of 100 is illustrated in the flowchart of FIG. 5.

When the MSC unit 100 is determined to be destaged at step 200, a first step 201 of determining whether there are one or more dirty blocks in the MSC unit 100 is performed. If there are one or more dirty blocks in the MSC unit 100 at the first step 201, a second step 202 is performed; otherwise, the destage of the unit MSC 100 is terminated at step 211.

At the second step 202, the basic rxw-matrix 110 is generated using the read-modify-write cycle and the reconstruct-write cycle in order to destage dirty blocks for each row of the MSC 100 unit.

Thereafter, the read contiguity transform is performed at a third step 203. In the read contiguity transform, the rxw element $m_{ij}$ to which the read operation is added, is in the discontiguous region between two discontiguous elements, $m_{aj}$ and $m_{bj}$, both of which include 'r' or 't'. In the discontiguous region, there exists no element that includes 'r' or 't'. However, if the stride distance between two discontiguous reads in the basic rxw-matrix 110 is greater than a predetermined "maximum read distance", the read contiguity transform for the discontiguous reads is disallowed. When a read operation is added to an element $m_{ij}$, operation 't' is used if $m_{ij}$ does not correspond to a parity block and the corresponding cache status $z_{ij}$ is dirty. Otherwise, operation 'r' is used.

Thereafter, the write contiguity transform is performed at a fourth step 204. In the write contiguity transform, the rxw element $m_{ij}$, to which the write operation can be added, is in the discontiguous region between two discontiguous elements, $m_{aj}$ and $m_{bj}$, both of which include 'w'. In the discontiguous region, there exists no element that includes 'w'. However, if the stride distance between two discontiguous writes in the basic rxw-matrix 110 is greater than a predetermined "maximum write distance", the write contiguity transform for the discontiguous writes is disallowed. Furthermore, when a write operation is added to an element $m_{ij}$, the write contiguity transform is disallowed if there exists at least one $m_{ij}$ such that its cache status, $z_{ij}$, is empty and $m_{ij}$ does not contain 'r', for all $m_{ij}$ that are in the discontiguous region between $m_{aj}$ and $m_{bj}$.

Thereafter, we determine whether the number of read operations 'r' or 't' is one or more in the transformed rxw-matrix at a fifth step 205. If the number of read operations 'r' or 't' is not one or more at fifth step 205, an eighth step 208 is performed. If the number of read operations 'r' or 't' is one or more at the fifth step 205, all reads of the transformed rxw-matrix 140 are actually requested to disks simultaneously at a sixth step 206.

After all of the requested reads are completed at a seventh step 207, XOR operations for each row of the final rxw-matrix 140 are performed at the eighth step 208, all writes of the transformed rxw-matrix 140 is requested to disks a ninth step 209

When all of the requested writes are completed at a tenth step 210, destaging the MSC unit 100 is completed at step 211.

If the maximum read distance is 1, there is no write contiguity transform that is assisted by the read contiguity transform. If we aggressively increase the maximum read distance in order to increase the possibility of the write contiguity transform without obeying the said rule that determined the maximum read distance, thereby achieving better performance.

A method of improving read performance according to the present invention is described below. The read performance improvement scheme is independent of the write performance improvement scheme.

The read performance improvement scheme of the present invention can improve read performance of a normal mode by sacrificing read performance of a degraded mode. In the degraded mode, the read performance must be improved using a parity cache. For this purpose, a complicated dependency occurs between read requests, therefore the implementation of the read of a RAID becomes complex, thus resulting in considerable overhead of read.

In order to reduce such overhead, reads in a degraded mode is always performed over the entire blocks of a stripe. Thus, the complicated dependency between read requests can be reduced. However, this results in poor performance for small read operations.

The read performance improvement scheme is illustrated in the flowchart of FIG. 6.

If a read request is generated and the read starts at step 300, the read request that ranges over two or more MSC units 100 is divided into several read requests for the respective MSC units at a first step 301 if the read request ranges over two or more MSC units 100.

Thereafter, a second step 302 of determining whether there is a failed disk is performed. If there is no failed disk at second step 302, a third step 303 of reading empty blocks of the MSC unit 100 for the divided read requests is performed, and then the read is terminated at step 309.

At a third step 303, there may be blocks that hit the cache by the MSC unit. Alternatively, all of the blocks that are requested may hit the cache. In this case, the read request is terminated without any read operation.

Meanwhile, if there is a failed disk at a second step 302, we determine whether there is an empty block in the MSC unit 100 at a fourth step 304. If there is an empty block in the MSC unit 100 at a fourth step 304, we determine whether the MSC unit 100 is under reading the entire blocks of the MSC unit 100 at a fifth step 305. If there is no empty block in the MSC unit 100 at the fourth step 304, the read is terminated at step 309. If the MSC unit 100 is under reading the entire blocks of the MSC unit 100 at the fifth step 305, the read request is inserted into the blocking list of the MSC unit 100 at an eighth step 308. Then, the read request is terminated at the seventh step 307.

If the MSC unit 100 is not under reading the entire blocks of the MSC unit 100 at fifth step 305, a sixth step 306 of producing a rxw-matrix in order to read all of the empty blocks of the MSC unit 100 is produced at a sixth step 306, and the read contiguity transform is performed for the rxw-matrix, and then reading the entire blocks of the MSC unit is performed by the rxw-matrix. However, this read contiguity transform may be omitted. After the read of the entire blocks of the stripe has been completed, a seventh step 307 of finishing read requests in the blocking list of the MSC unit 100 is performed, and the read is then terminated at step 309.

As described above, the present invention can improve the performance of discontiguously sequential writes of disk arrays with sophisticated fault-tolerant schemes such as RAID-5, RAID-6 and so on.

What is claimed is:

1. A method of improving Input/Output (I/O) performance of a Redundant Array of Independent Disk (RAID) system using a Matrix Stripe Cache (MSC), the method comprising:
   a first step of generating a basic rxw-matrix, which presents all of reads, XOR operations, and writes that are required to destage a stripe cache, which is selected to be destaged to disks, in an MSC unit that will perform writing on disks;
   a second step of performing a contiguity transform for the basic rxw-matrix in order to generate a transformed rxw-matrix, which contains final reads, XOR operations, and writes that are required to destage the selected MSC unit,
   wherein the contiguity transform of the second step1 comprises:
   a read contiguity transform and a write contiguity transform, wherein the read contiguity transform precedes the write contiguity transform, and
   wherein, for each column of the basic rxw-matrix, a read contiguity transform comprises reading the unnecessary region between two need to be read areas and inserting unnecessary read operations into a discontiguous region between two discontiguous elements, where both of which include a read operation and are located in the same column, and there exists no element between them in the rxw-matrix that includes a read operation,
   wherein, for each column of the basic rxw-matrix, a write contiguity transform comprises writing the unnecessary region between two need to be written areas and inserting unnecessary write operations into the discontiguous region between two discontiguous elements, where both of which include a write operation and are located in the same column, and there exists no element between them in the rxw-matrix that includes a write operation; and
   a third step of performing reads based on the transformed rxw-matrix generated at the second step, performing XOR operations based on the transformed rxw-matrix, and performing writes based on the transformed rxw-matrix.

2. The method as set forth in claim 1, wherein:
   for each column of the basic rxw-matrix, the read contiguity transform is not permitted if the number of elements which do not include read operation between two discontiguous elements including a read operation is greater than a predetermined maximum read distance; and
   for each column of the basic rxw-matrix, the write contiguity transform is not permitted if the number of elements which do not include write operation between two discontiguous elements including a write operation is greater than a predetermined maximum write distance.

3. The method as set forth in claim 2, wherein:
   the predetermined maximum read distance is the smallest stride distance of the stride reads which exhibit faster performance than the contiguous read that has the equivalent seek distance with the stride read; and
   the predetermined maximum write distance is the smallest stride distance of the stride writes which exhibit faster performance than the contiguous write that has the equivalent seek distance,
   wherein, the stride distance is defined by the number of blocks between two discontiguous I/Os and the equivalent seek distance indicates that identical start and end position are applied.

4. A method of improving I/O performance of a RAID system using a Matrix Stripe Cache (MSC), the method comprising:
   a first step of determining whether at least one dirty block exists in an MSC unit that is selected to be destaged to disks (if a host writes a block, the written data is copied into a corresponding block cache of the MSC unit before it is actually destaged to disks and the block cache becomes a dirty block);
   a second step of, if at least one dirty block is determined to exist in the MSC unit, generating read, XOR, and write operations into a basic rxw-matrix in order to destage the MSC unit;
   a third step of a read contiguity transform, for each column of the basic rxw-matrix, which comprises reading the unnecessary region between two need to be read areas and inserts unnecessary read operations between two discontiguous elements including a read operation that are located in the same column, wherein for each column of the basic rxw-matrix, a read contiguity transform is not permitted if the number of elements which do not include read operations between two discontiguous elements including a read operation is greater than a predetermined maximum read distance;

a fourth step of a write contiguity transform, for each column of the rxw-matrix, which comprises writing the unnecessary region between two need to be written areas and inserts unnecessary write operations between two discontiguous elements including a write operation that are located in the same column, wherein, for each column of the basic rxw-matrix, a write contiguity transform is not permitted if the number of elements which do not include a write operation between two discontiguous elements including a write operation is greater than a predetermined maximum write distance;

a fifth step of determining whether the read operation is at least one in a transformed rxw-matrix that is processed through the third and fourth steps, and performing reading for each column of the transformed rxw-matrix if there is at least one read operation; and a sixth step of performing an XOR operation for each row of the transformed rxw-matrix, and then performing writing for each column of the transformed rxw-matrix.

5. The method as set forth in claim 4, wherein:

the predetermined maximum read distance is the smallest stride distance of the stride reads which exhibit faster performance than the contiguous read that has the equivalent seek distance with the stride read; and the predetermined maximum write distance is the smallest stride distance of the stride writes which exhibit faster performance than the contiguous write that has the equivalent seek distance with the stride write, wherein, the stride distance is defined by the number of blocks between two discontiguous I/Os and the equivalent seek distance indicates that identical start and end position are applied.

6. The method as set forth in claim 4, wherein, at the third step, if a cache status $z_{ij}$, which corresponds to an element $m_{ij}$, of the basic rxw-matrix that is determined to be inserted with a read operation, is dirty, 't' is inserted into the element $m_{ij}$, for the read operation, and if the cache status $z_{ij}$ is not dirty, 'r' is inserted into the element for the read operation, wherein, 'r' indicates a read operation for the block from the disk to a block cache memory, and 't' indicates a read operation for the block from the disk to a temporary memory.

7. The method as set forth in claim 4, wherein, at the fourth step, when a write operation is added to an element the write contiguity transform is disallowed if there exists at least one $m_{ij}$ such that its cache status $z_{ij}$ is empty and $m_{ij}$ does not contain 'r', for all $m_{ij}$ that are in the discontiguous region between $m_{aj}$ and $m_{bj}$.

8. A method of improving Input/Output (I/O) performance of a Redundant Array of Independent Disks (RAID) system using a Matrix Stripe Cache (MSC), the method comprising:

a first step of determining if a read request ranges over at least two MSC units;

a second step of determining whether a failed disk exists;

a third step of, if, as a result of the determination at the second step, no failed disk is found to exist, determining whether an empty block exists in a corresponding MSC unit;

a fourth step of, if, as a result of the determination at the third step, an empty block is found to exist, determining whether the corresponding MSC unit is busy reading blocks of the MSC unit;

a fifth step of, if, as a result of the determination at the fourth step, the corresponding MSC unit is determined to be busy reading blocks of the MSC, adding the read request to a list of read operations of the MSC unit that causes the host process that requested the read to block;

a sixth step of, if, as a result of the determination at the fourth step, it is determined that the MSC unit is not busy reading blocks of the MSC unit, producing an rxw-matrix, that is, a read, XOR, and write matrix for all of the empty blocks of the MSC unit; then the read contiguity transform, which comprises reading the unnecessary region between two need to be read areas and inserting unnecessary read operations between two discontiguous elements, is performed on the rxw-matrix, and then reading entire blocks of the MSC unit based on the rxw-matrix; and a seventh step of terminating all read requests existing in the blocking list of the MSC unit after the entire reading has been completed at the sixth step, wherein, the MSC unit is a cache unit that is managed in terms of stripe groups.

9. The method as set forth in claim 8, wherein, if failed disk is not found to exist at the second step, reading is performed on empty blocks of the MSC unit and is then terminated at each of the read requests.

* * * * *